Figure 1:
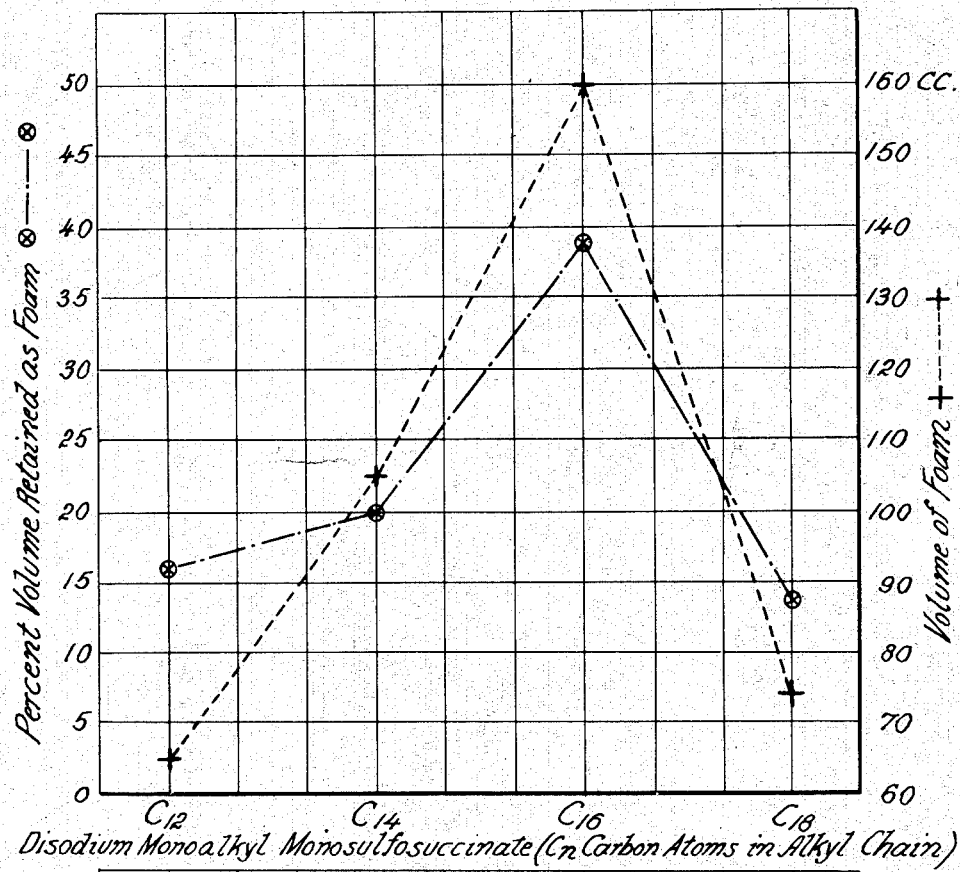

Patented Apr. 13, 1943

2,316,234

UNITED STATES PATENT OFFICE 2,316,234

ESTER OF SULPHOSUCCINIC ACID

Lawrence H. Flett, Hamburg, N. Y., assignor to Allied Chemical & Dye Corporation, a corporation of New York Application November 30, 1940, Serial No. 367,965

1 Claim. (Cl. 260—481)

This invention relates to a small new group of compounds lying within the large class of esters of sulpho-aliphatic dicarboxylic acids that are useful as wetting agents, emulsifying agents and detergents. The new group of compounds finds particular use as washing agents, especially for regenerated cellulose rayon, and as dispersing agents for water-insoluble organic coloring agents, especially for dyes for cellulose esters, such as cellulose acetate.

Esters of sulpho-aliphatic dicarboxylic acids are known in which the carboxyl groups are esterified by long-chain alcohols. Thus the monooctyl, the dilauryl and the distearyl esters of sulphosuccinic acid in the form of their sodium salts are known.

The present invention is based on the discovery that the monocetyl esters of sulphosuccinic acids constitute a group of compounds possessing outstandingly desirable properties much beyond what would be expected, judging by the properties of the closely homologous compounds. The monocetyl esters of sulphosuccinic acids in the form of the free acids correspond with the formula:

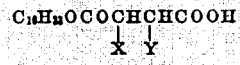

in which X and Y are each selected from the group consisting of hydrogen, methyl and —SO₃H but at least one of X and Y is —SO₃H. (As employed herein, the term "cetyl" denotes the normal primary hexadecyl radical

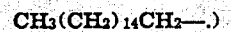

I have found that the presence in said esters of the particular combination of a single alkyl chain of 16 carbon atoms and a free carboxyl group (in the acid or salt form) as well as a free sulpho group (in the acid or salt form) imparts desirable surface active properties to said esters which are not present in closely related esters in which the alkyl groups contain carbon chains with more or fewer carbon atoms.

A preferred form of this invention is embodied in the salts, especially the alkali metal, ammonium and organic base salts, of monocetyl carboxylic ester of monosulpho-succinic acid.

The new compounds may be prepared by methods similar to the known methods for making known members of the class of esters of sulpho-aliphatic dicarboxylic acids. Preferably the compounds of this invention are prepared by the reaction of sulphurous acid or a water-soluble sulphite (such as an ammonium salt, a sodium or other alkali metal salt, or an organic base salt of sulphurous acid) with a monocetyl ester of maleic or fumaric acid. The reaction yields the monocetyl carboxylic ester of monsulpho-succinic acid in the form of the free acid or a salt in which the salt-forming cation is the metal, ammonium or organic cation of the reacting sulphite.

The compounds of this invention also may be prepared by reacting bisulphites, sulphites or sulphurous acid with monocetyl carboxylic esters of succinic acid containing in the succinic acid residue a replaceable atom or group; for example, the esters which are represented by the following formula:

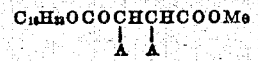

in which Me represents hydrogen or its chemical equivalent of a salt-forming metal or group; one A is hydrogen or a methyl group; and the other A is halogen, or a sulphate or phosphate group.

The compounds of the invention can be applied individually or as mixtures at suitable concentrations for a very large number and variety of purposes. They are characterized by specially high detergent power, and they show unusual cleansing action in many cases; for example, in washing regenerated cellulose, where soapless detergents as a class are deficient. Because of these characteristics, they are admirably suited for incorporation in detergent preparations in which enhanced washing qualities are desired. For detergent purposes in water, they are very effective even at low concentration and are usually applied in concentrations which range from 0.05 to 0.2 per cent. They can be used at such concentrations for laundry work; personal use; dispersing dyes in dyeing and printing preparations and applications; germicidal compositions; insecticidal sprays; dispersing materials in the manufacture of finely divided pigments; dispersing active substances for impregnated textile materials, wood, leather, etc.; aiding in the dyeing or coloration of cellulose acetate and other esters or materials containing acetate and ester silks.

They may be used as advantageous dispersing assistants in lubricants, treating and spinning oils, dust-laying sprays and compositions, and in the suspension of pigments in lacquers.

Because of their unusual cleaning properties, the compounds of this invention are specially suitable ingredients for cosmetic preparations.

These compounds, by virtue of their rapid emulsifying and dispersing properties, are very useful and valuable ingredients of dry preparations of dyestuffs and coloring matters which are applied as dispersions in water for dyeing or coloring natural silk or materials which are made of or contain cellulose esters, especially cellulose acetate. In such dye compositions the compounds of this invention play a two-fold part: (1) they disrupt the dyestuff particles when the dry mixtures are added to water, and thereby prevent conglomeration of dye particles; and (2) they disperse thoroughly the dye particles throughout the dye bath liquid and thereby assure, without the aid of vigorous mechanical agitation, uniform distribution of dyestuff throughout the dye bath, and uniform dyeing of material dyed therein.

The salts of the monocetyl carboxylic ester of monosulpho-succinic acid which contain ammonium, alkali metal or water-soluble organic base cations are generally soluble in water. They are also soluble in organic solvents such as alcohol, benzene, toluene, etc. In the pure form the salts yield practically colorless solutions in colorless solvents. They can be recrystallized from their aqueous solutions.

The salts of the monocetyl carboxylic ester of monosulpho-succinic acid are unexpectedly outstanding in their detergent and foaming properties. They are especially preferred in compositions and their applications for the preparation, cleansing, finishing or other treatment of regenerated cellulose and materials containing regenerated cellulose.

The invention is illustrated by the following examples in which parts are by weight:

EXAMPLE 1

A mixture of 484 parts (2 mols) of commercial cetyl alcohol which was derived from sperm oil and 200 parts (2.02 mols) of maleic anhydride is agitated and heated by means of a boiling water bath for 3 hours. The product so obtained is an acid ester of commercial cetyl alcohol and for convenience is referred to as "monocetyl maleate."

680 parts (2 mols) of monocetyl maleate are heated to refluxing with 252 parts (2 mols) of sodium sulphite in 2400 parts of water for 4 hours. The mixture becomes a clear solution in 1 hour. There is some foaming during the boiling. The temperature of the mixture is reduced as necessary to control foaming. Good agitation is maintained throughout the heating period. In four hours, there is no free sodium sulphite left in solution and the solution is exactly neutral to delta paper which indicates a pH between 6 and 7. (Delta paper is paper stained with the dyestuff obtained by coupling diazotized 2,4-dinitraniline into 3,6-disulpho-1-naphthol). The hot solution is filtered through filter-cel and dried on a drum drier. About 869 parts of product (93.2% of theoretical yield) are obtained.

The product is chiefly disodium monocetyl monosulphosuccinate having the probable formula:

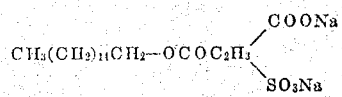

The commercial cetyl alcohol described and used in preparing the product above contains approximately 22 per cent of unsaturated alcohols (probably oleyl alcohol) and smaller amounts of stearyl and myristyl alcohols. Consequently the detergent product presumably contains a substantial proportion of disodium mono-oleyl monosulphosuccinate and minor amounts of disodium monostearyl monosulphosuccinate and disodium monomyristyl monosulphosuccinate.

The resulting mixture is a particularly effective washing agent, its unusually high detergent qualities being due to the presence therein of an effective amount of disodium monocetyl monosulphosuccinate.

The following example shows the marked and entirely unexpected and unforeseeable superiority in detergency and foaming properties of the monocetyl ester of monosulpho-succinic acid when compared with the homologous and closely related esters containing, respectively, 12, 14 and 18 carbon atoms in a similar alkyl chain.

EXAMPLE 2

The following normal primary alcohols in their respective following amounts (one mol) were each mixed with 103 parts of maleic anhydride (1.05 mols) and each mixture was agitated and heated at 100 to 105° C. for 2 hours:

Alcohol: Parts by weight
Lauryl (B. P. 145–147° C. at 15 mm.) ____ 186
Myristyl (B. P. 167–170° C. at 15 mm.) __ 214
Cetyl (B. P. 187–189° C. at 15 mm.) _____ 242
Stearyl (Eastman pure) _____ 270

After the heating period was over, a solution having the following composition was added to each reaction mixture, which contained the monoalkyl ester of maleic acid corresponding with the alcohol employed:

Sodium bisulphite—109 parts (1.05 mols).
Sodium hydroxide—approximately 82 parts of a 50% aqueous solution: sufficient to make the solution slightly pink to phenolphthalein (approximately 1.05 mols).
Water—approximately 440 parts.

The reaction mixture was agitated at 100 to 105° C. for 3 hours (unless foaming was excessive, in which case the temperature was lowered to 97 to 100° C.), the solution was diluted to about 20 per cent strength, adjusted to neutrality to delta paper, and drum dried. To purify the products, they were each dissolved in water to form a 10 per cent solution, and agitated at 55 to 60° C. for a half hour with 10 per cent of decolorizing charcoal ("Darco"), based on the weight of the product. The solution was filtered through "Supercel" and drum dried.

To compare the foaming action of the resulting products, aqueous solutions of each of the products were prepared containing 0.05% by weight of the product. Each solution was tested in the following manner:

50 cc. of the solution to be tested were placed in a testing apparatus consisting of a 500 cc. cylindrical graduate and a plunger consisting of a No. 9 rubber stopper or cork (having a top diameter of about one inch and three-quarters, a bottom diameter of about an inch and seven-sixteenths, and a height of about one inch) mounted on its center on a glass rod extending well above the top of the graduate. The stopper or cork was of such a size that it slipped easily inside the cylinder. Foam was generated by plunging the stopper into, and withdrawing it from, the solution in uniform strokes between the bottom and the 200 cc. mark of the graduate at a rate of about two strokes per second for 30 seconds. The total volume of foam and liquid and the volume of liquid which had separated at the bottom of the graduate were measured after standing for three minutes. The solutions were tested at substantially the same temperature.

The results are set out in the following Table I.

Table I

| Ester | Percent volume retained as foam | Volume of foam in cc. |
|---|---|---|
| Disodium monolauryl monosulphosuccinate ($C_{12}$) | 16 | 65 |
| Disodium monomyristyl monosulphosuccinate ($C_{14}$) | 20 | 105 |
| Disodium monocetyl monosulphosuccinate ($C_{16}$) | 39 | 160 |
| Disodium monostearyl monosulphosuccinate ($C_{18}$) | 14 | 75 |

To compare the detergency of the products, wool washing tests were conducted as follows:

Botany woolen worsted was uniformly soiled in a soiling bath consisting of a mixture of 4 liters of carbon tetrachloride, ¼ gram of lamp black, 35 cc. of mineral oil (white oil) and 7½ grams of tallow. After drying in an oven at 20° C. for 1 hour and aging for a week in the atmosphere at room temperature, the cloth was cut into pieces of approximately equal size (4 inches by 4 inches) and readings were taken of the intensity of reflected light (brightness) with a Lange Universal reflectometer. Pieces of the soiled cloth were then washed in a "Launder-ometer" in the following manner: A piece of the soiled cloth was placed in a pint preserving jar containing 200 cc. of an aqueous solution of the product to be tested and 125 quarter-inch Monel metal balls, and the jar was covered and rotated for a period of 30 minutes at 50° C. Tests were made with solutions prepared by adding 0.2 gram of the product being tested plus 0.2 gram of sodium sulphate (1) to 200 cc. of distilled water, and (2) to 200 cc. of distilled water to which 1 cc. of 5 per cent aqueous calcium chloride solution had been added (equivalent to water of 12° hardness). The washed pieces of cloth were rinsed with cold water, and dried in the air. Readings were again taken with the reflectometer. The difference in readings, representing increased brightness, is a measure of the detergency of the products.

The results are set out in the following Table II.

Table II

| Ester | Detergency (increase in brightness) | |
|---|---|---|
| | Soft water | 12° hard water |
| Disodium monolauryl monosulphosuccinate ($C_{12}$) | 6.5 | 2 |
| Disodium monomyristyl monosulphosuccinate ($C_{14}$) | 7 | 5 |
| Disodium monocetyl monosulphosuccinate ($C_{16}$) | 11.5 | 14.5 |
| Disodium monostearyl monosulphosuccinate ($C_{18}$) | 8 | 2.5 |

Figure 2:
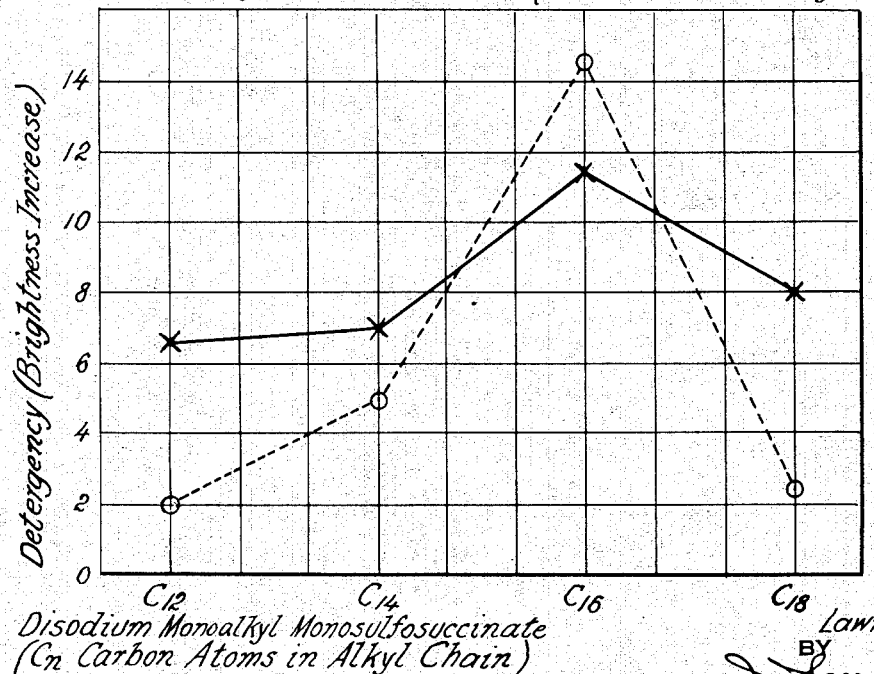

In order to illustrate more clearly the superior foaming and detergent properties of the monocetyl ester of monosulpho-succinic acid, the results of the above tests set out in Tables I and II were plotted as graphs. The resulting graphs appear as Figs. 1 and 2 of the drawing, respectively, which are self-explanatory.

The following example illustrates the superiority of disodium monocetyl monosulphosuccinate for washing regenerated cellulose.

EXAMPLE 3

A mixture which was chiefly disodium monocetyl monosulphosuccinate was prepared from commercial cetyl alcohol by following substantially the procedure of Example 2, except that when preparing the monocetyl acid ester 1.05 mols of cetyl alcohol per mol of maleic anhydride were used.

Rayon flat crepe (du Pont Dulite) was cut into strips each 21 feet long and 9 inches wide; the strips were sewn into an endless belt which was soiled with the aid of an experimental soiling machine, by being passed ten times through a solution composed of 4000 cc. of carbon tetrachloride, 6 grams of tallow, 20 grams of "Nujol" (refined white oil) and 4 grams of lamp black, and through a wringer after each passage through the soiling mixture. The uniformly soiled strip was dried in a steam oven for one hour and aged five days at room temperature. The resulting soiled cloth was tested for brightness using a Zeiss-Pulfrich photometer. The same instrument was used to determine the brightness of samples of the soiled cloth after they had been washed.

The detergent qualities of the mixture containing chiefly disodium monocetyl monosulphosuccinate, prepared as described above, were compared with those of "Lux"—a sodium soap manufactured by Lever Brothers and extensively advertised as a highly effective washing agent—and with disodium monolauryl monosulphosuccinate prepared from commercial lauryl alcohol substantially by the method of Example 2. Aqueous solutions were prepared, each containing 0.18 part of the product to be tested dissolved in 100 parts of water having 2.5 degrees of hardness (American scale). One pint of solution was used to wash a piece of soiled cloth nine inches square. The washing was conducted by dipping the cloth, moving it around and squeezing the cloth in the solution, then withdrawing the cloth and wringing it out by hand about once every minute. This procedure was continued for 5 minutes. The cloth was then rinsed in distilled water for one half minute and wrung out by hand. Finally, the cloth was hung indoors until dry. Detergent action of the solutions was measured by the increases in brightness of the cloths effected by the washings. The results are shown in Table III.

Table III

| Product | Detergency (increase in brightness) |
|---|---|
| "Lux" | 6.6 |
| Disodium monocetyl monosulphosuccinate | 13.4 |
| Disodium monolauryl monosulphosuccinate | 6.5 |

I claim:

Disodium monocetyl-monosulphosuccinate.

LAWRENCE H. FLETT.